(12) United States Patent
Svendsen et al.

(10) Patent No.: US 8,449,253 B2
(45) Date of Patent: *May 28, 2013

(54) CONTROL OF ROTOR DURING A STOP PROCESS OF A WIND TURBINE

(75) Inventors: Rasmus Svendsen, Randers (DK); Keld Hammerum, Hadsten (DK)

(73) Assignee: Vestas Wind Systems A/S, Aarhus N (DK)

(*) Notice: Subject to any disclaimer, the term of this patent is extended or adjusted under 35 U.S.C. 154(b) by 798 days.

This patent is subject to a terminal disclaimer.

(21) Appl. No.: 12/692,248

(22) Filed: Jan. 22, 2010

(65) Prior Publication Data

US 2010/0196156 A1 Aug. 5, 2010

Related U.S. Application Data

(60) Provisional application No. 61/146,912, filed on Jan. 23, 2009.

(30) Foreign Application Priority Data

Jan. 22, 2009 (DK) ................................. 2009 00097

(51) Int. Cl.
*F03D 7/04* (2006.01)
(52) U.S. Cl.
USPC ................................................ 416/1; 416/31
(58) Field of Classification Search
USPC .................. 416/25, 26, 27, 30, 43, 44, 49, 31, 416/41
See application file for complete search history.

(56) References Cited

U.S. PATENT DOCUMENTS

| | | | |
|---|---|---|---|
| 4,193,005 | A | 3/1980 | Kos et al. |
| 4,435,647 | A | 3/1984 | Harner et al. |
| 6,876,099 | B2 | 4/2005 | Wobben |
| 7,218,012 | B1 | 5/2007 | Edenfeld |

(Continued)

FOREIGN PATENT DOCUMENTS

| | | |
|---|---|---|
| DE | 102006001613 A1 | 7/2007 |
| EP | 1701034 A2 | 9/2006 |

(Continued)

OTHER PUBLICATIONS

Danish Search Report; PA 2007 01047; Feb. 21, 2008; 1 page.
Danish Search Report; PA 200900097; Aug. 13, 2009; 2 pages.

(Continued)

*Primary Examiner* — Richard Edgar
(74) *Attorney, Agent, or Firm* — Wood, Herron & Evans, LLP

(57) ABSTRACT

A method for controlling a pitch angle of blades of a wind turbine rotor during an emergency stop process of the rotor from an operating state, includes the steps of: (i) continuously determining a measure of an angular acceleration of the rotor, (ii) initiating pitching of the rotor blades and continuing pitching until a time ($t_2$) where the determined angular acceleration of the rotor is substantially zero, and (iii) resuming pitching of the rotor blades at the end of a predetermined time period ($t_3$-$t_2$) after the time ($t_2$) where the determined angular acceleration of the rotor was substantially zero. A wind turbine including an emergency stop control system having a mechanism for controlling an emergency stop process of the wind turbine rotor according to such a method is also contemplated.

16 Claims, 6 Drawing Sheets

U.S. PATENT DOCUMENTS

| | | |
|---|---|---|
| 7,488,155 B2 * | 2/2009 | Barbu et al. .................. 416/1 |
| 2004/0108729 A1 | 6/2004 | Wobben |
| 2006/0033338 A1 | 2/2006 | Wilson |
| 2007/0018457 A1 | 1/2007 | Llorente Gonzalez |
| 2007/0116572 A1 | 5/2007 | Barbu et al. |

FOREIGN PATENT DOCUMENTS

| | | |
|---|---|---|
| EP | 1719910 A1 | 11/2006 |
| EP | 1788237 A2 | 5/2007 |
| WO | 9007823 A1 | 6/1990 |
| WO | 2006007838 A1 | 1/2006 |
| WO | 2007012487 A1 | 2/2007 |
| WO | 2009010059 A2 | 1/2009 |

OTHER PUBLICATIONS

Bossanyi E A: "The Design of Closed Loop Controllers for Wind Turbines" Wind Energy, Wiley, vol. 3, No. 3, Jan. 1, 2000, pp. 149-163, XP007908706 ISSN: 1095-4244 [retrieved on Jul. 19, 2001] pp. 155-158.

Chava Jucker; Search Report issued in related European Application No. EP 11003793.4; Jul. 22, 2011, 5 pages; European Patent Office.

Chava Jucker; Search Report issued in related European Application No. EP 11003792.6; Aug. 2, 2011, 4 pages; European Patent Office.

Chava Jucker; Search Report issued in related European Application No. EP 11003791.8; Aug. 2, 2011, 4 pages; European Patent Office.

* cited by examiner

CONTROL OF ROTOR DURING A STOP PROCESS OF A WIND TURBINE

CROSS-REFERENCE TO RELATED APPLICATIONS

The present application claims priority from Danish patent application PA 2009 00097 filed on Jan. 22, 2009. The present application also claims the benefit under 35 U.S.C. §119(e) of the U.S. Provisional Patent Application Ser. No. 61/146,912 filed on Jan. 23, 2009. The content of all prior applications is incorporated herein by reference.

FIELD OF THE INVENTION

The present invention relates to a method and a control device for controlling the pitching of the rotor blades during a stop process of a wind turbine.

BACKGROUND OF THE INVENTION

It is well-known that the blades of a pitch-regulated or active stall regulated wind turbine when it is stopped are pitched to a feathered parking position where an edge of the blade is directed towards the wind turbine tower and the other edge is directed away from the tower, so that aerodynamic forces from the wind on the blades will not cause harm to the wind turbine. Such stops are performed for maintenance of the turbine, at low wind periods and very high wind periods as well as for emergency stop of the operation of the wind turbine due to malfunction of the turbine itself of problems on the electrical grid which may cause the wind turbine to halt the emission of active power to the grid, such as a severe reduction of the grid voltage.

A rapid pitching of the blades may cause harm to the blades and to the wind turbine as described e.g. in international patent application WO 2006/007838 (Vestas), which discloses a method of controlling the pitch rate by rapidly pitching the blades to a position where the acceleration force on the rotor is zero, i.e. that the rotation of the rotor is not accelerated, followed by a slower pitching rate to the parking position.

In European patent application EP 1 701 034 (Winwind) is disclosed a method of stopping the rotor of a wind turbine where account is taken to reduce the pendulum motion of the wind turbine tower that is caused when the positive thrust on the rotor during normal operation providing a deflection of the tower in the downwind direction is replaced by a negative thrust when the blades are pitched towards the parking position, so that the tower when moving towards the wind from the deflected position is accelerated towards the wind direction, causing a huge bending moment on the base of the tower. This is counteracted by pitching with a high angle speed of e.g. 15°/s until the tower is about its vertical position and then reduce the angle speed to e.g. 5°/s or even 0°/s until the extreme position of the tower in the upwind direction is reached, whereafter the high angle speed is resumed until the parking position of the blades is reached.

It is an object of the present invention to provide a stop process of the wind turbine where the extreme bending moment applied to the wind turbine tower is reduced.

SUMMARY OF THE INVENTION

The present invention provides an advantageous solution to the above stated problem by pitching the rotor blades fast, e.g. with a angular rate of 10-15°/s to a position where the rotor does not accelerate is rotation, after which the pitching of the rotor blades temporarily is stopped. When the angular acceleration of the rotor is about zero, the aerodynamic thrust force on the rotor is known to be very low and close to zero, and the pitch position prevents the aerodynamic thrust force from aggravating the pendulum movement of the tower. The pitching is resumed after a predetermined time period has been measured out from the first stop of the pitching of the rotor blades. With this control strategy, the huge bending moments of the tower root that for a simple stop process with a constant angular pitching rate may reach a magnitude of 2.5 times the maximum bending moment under ordinary operation, may be avoided, leading to avoidance of wind turbine tower failure, to prolongation of the life time for a wind turbine tower and the possibility of erecting wind turbine towers of less reinforcement at the tower root.

The angular acceleration of the rotor may be determined from the angular velocity of the rotor measured in an in itself well-known manner on e.g. the rotor or the low-speed shaft leading from the rotor to a gearbox or to a generator of a direct driven wind turbine, preferably measured by means of a fiber optical gyro. An angular velocity of a high speed shaft of a gearbox could alternatively be employed. As a further alternative, a measure of the accelerating torque may be measured by means of a strain gauge on the low-speed shaft detecting the angular strain thereof and thereby providing a measure of the angular acceleration of the wind turbine rotor. The stop process of the present invention is implemented for emergency stops, e.g. where the generator is not producing power to the distribution grid.

Thus the present invention relates to a method for controlling the pitch angle of the blades of a wind turbine rotor during an emergency stop process of the rotor from an operating state, the method comprising the steps of continuously determining a measure of the angular acceleration of the rotor, initiate pitching of the rotor blades and continue pitching until the time where the determined angular acceleration of the rotor is substantially zero, and resume pitching of the rotor blades at the end of a predetermined time period after the time where the determined angular acceleration of the rotor was substantially zero.

It is preferred for simplicity and robustness of the control system that the pitching of the rotor blades is controlled in an on-off manner during the emergency stop process.

The predetermined time period is preferably in the range of 0.25 to 0.8, more preferably in the range of 0.4 to 0.6, times the period length of the first natural eigen-frequency mode of the wind turbine tower. As an alternative manner of defining the predetermined time period, it is preferably in the range of 2 to 5 seconds, most preferably in the range of 2.5 to 4 seconds.

Hereby, it is ensured that the pitching is resumed after the tower has passed the upwind extreme position or is close to passing this position. Thus, the aerodynamic thrust force in the direction towards the wind, the so-called negative thrust, will generally not occur until the tower is moving away from the wind and will in that situation dampen the motion of the tower.

In a further preferred embodiment, the method may comprise the step of starting a time measurement at the time when the determined angular acceleration of the rotor is substantially zero, and controlling said resuming of pitching of the rotor blades in response to said time measurement reaching the end of the predetermined time period, i.e. that the predetermined time period is controlled by means of an actual time measurement.

According to one embodiment, the method is applied on a hydraulic pitching system and comprises the steps of closing a valve in the hydraulic connection between an emergency supply of hydraulic pressure and drive means for driving the pitching of the rotor blades at the time when the determined angular acceleration of the rotor is substantially zero, and opening said valve said predetermined time period after the time where the determined angular acceleration of the rotor was substantially zero.

According to another embodiment of the present invention, the method comprises the steps of open an electrical switch in the electric connection between an emergency power supply and drive means for driving the pitching of the rotor blades at the time when the determined angular acceleration of the rotor is substantially zero, and closing said electrical switch said predetermined time period after the time where the determined angular acceleration of the rotor was substantially zero.

It is preferred that the method in case of e.g. a wind gust on the rotor blades occurring during the predetermined time period, further comprises the step of resume pitching of the rotor blades within said predetermined time period in case the determined angular velocity of the rotor reaches a value being a predetermined amount higher than the angular velocity than at the time where the determined angular acceleration of the rotor was substantially zero. Hereby, an uncontrolled acceleration of the rotor is avoided, which may lead to damages on the wind turbine. In particular, it is preferred that the pitching is stopped again in case the determined angular acceleration of the rotor is substantially zero within said predetermined time period so as to avoid negative thrust force on the rotor.

The mentioned predetermined amount of angular velocity is preferably within the range of 0.75 RMP/s to 1.5 RPM/s.

The present invention further relates to a wind turbine having an emergency stop control system adapted to perform the above method.

BRIEF DESCRIPTION OF THE DRAWINGS

An embodiment of the invention will be described in the following with reference to the enclosed drawing of which

The figures are provided to illustrate and support the understanding of the invention and are not to be regarded as limiting of the scope of protection defined by the appended claims.

DETAILED DESCRIPTION OF THE INVENTION

Figure 1:
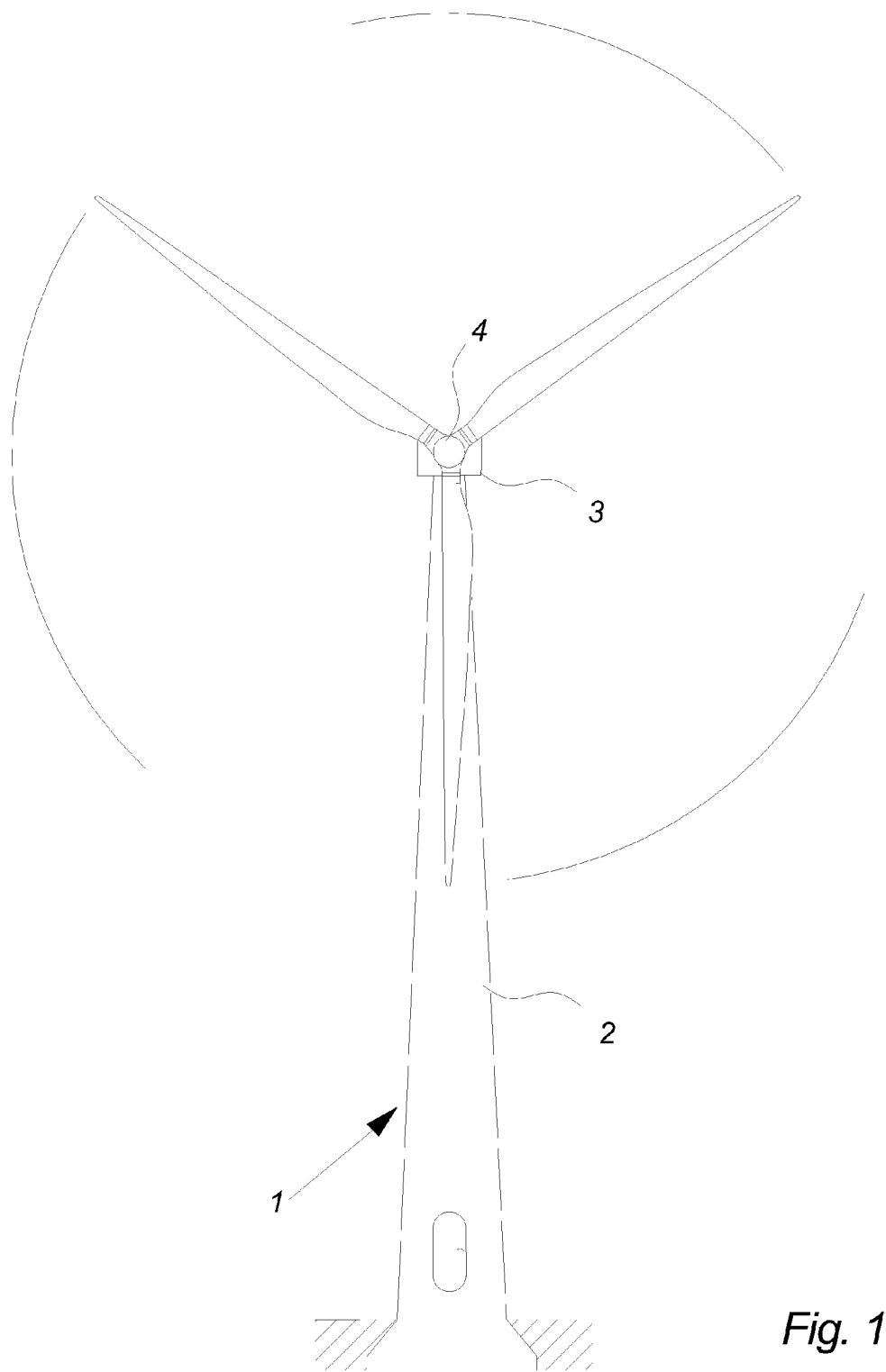
FIG. 1 illustrates a large modern wind turbine as seen from the front.

FIG. 1 illustrates a modern wind turbine 1, comprising a tower 2 and a wind turbine nacelle 3 positioned on top of the tower 2. The wind turbine rotor 4 comprising three wind turbine blades 5 is connected to the nacelle 3 through the low speed shaft which extends from the front of the nacelle 3.

Figure 2:
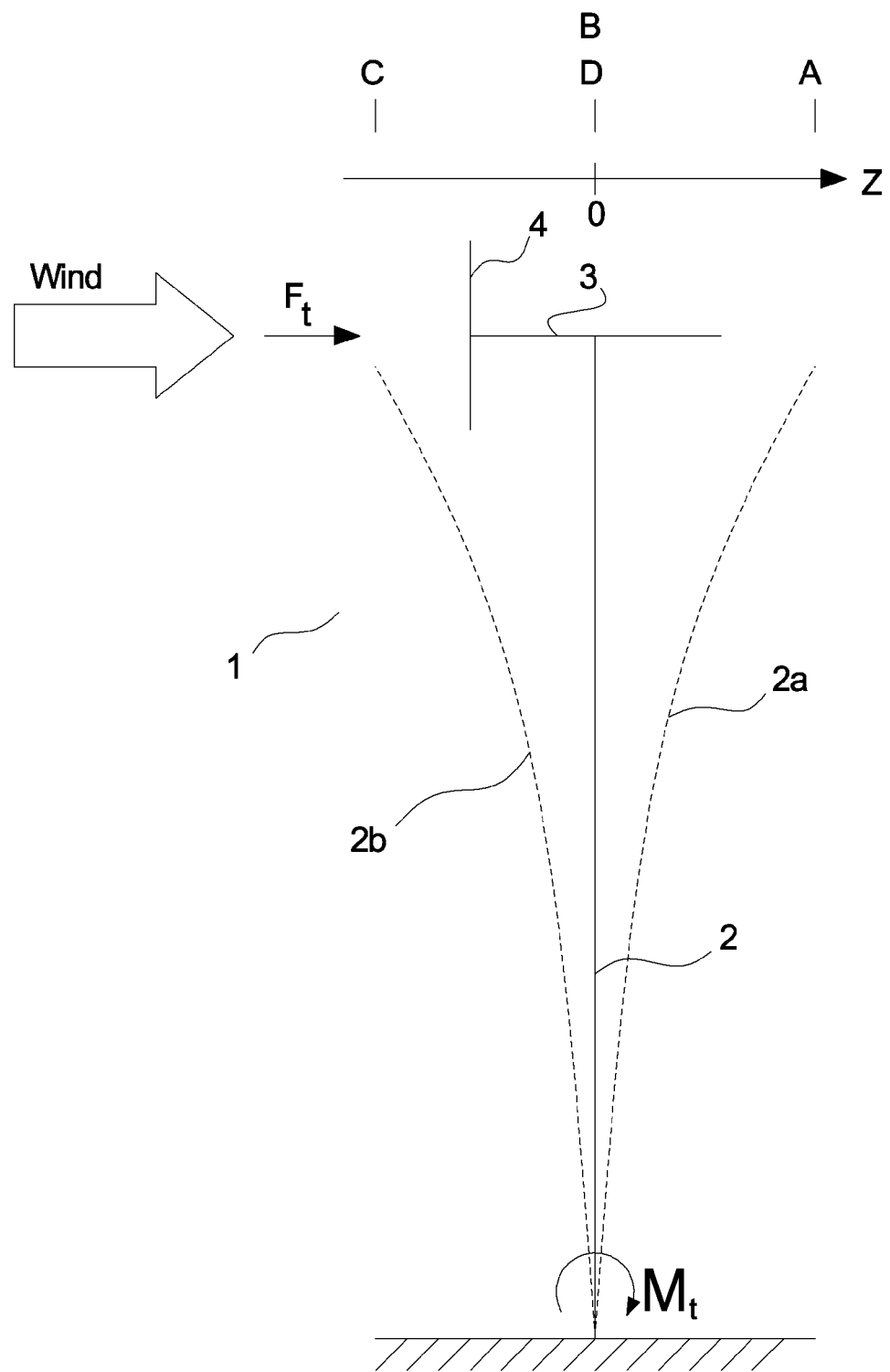
FIG. 2 illustrates the deflection of the wind turbine during an emergency shut-down.

When the wind turbine 1 is in operation, the wind as shown in FIG. 2 provides an aerodynamic torque on the turbine rotor 4, which is converted to the production of output active power from the wind turbine to an electrical distribution grid. The wind also provides an aerodynamic thrust force $F_t$ on the rotor, causing the wind turbine tower 2 to bend in the direction away from the wind to the position shown with the right dotted line 2a, where the top of the tower is in position A and is deflected z, indicating the distance from the top of the tower to position of the top of the tower when the tower is in its vertical position. The thrust force $F_t$ on the rotor gives a bending moment $M_t$ on the base of the tower. When the shut-down or emergency stop process starts at $t_1$, the top of the tower is at position A. The aerodynamic torque on the rotor is then reduced to substantially zero because the blades of the rotor are pitched away from the productive operating position to a position, where the thrust force is substantially zero. The pitching is fast, typically with a speed of 10-15°/s and the position is reached after about 0.5 seconds at $t_3$ when the pitching is stopped again. The acceleration of the rotor or a measure therefore is determined by measuring e.g. the angular speed of the rotor shaft (which herein is understood to include the low speed shaft of a gear box or a low speed shaft of an electrical generator connected directly to the rotor shaft, so-called direct drive), and finding the time derivative of the angular speed or by measuring the angular strain of the rotor shaft, preferably by means of one or more strain gauges. The aerodynamic torque on the rotor being substantially zero means that the angular acceleration of the rotor is substantially zero, e.g. +/− less than 0.5 RPM/s$^2$, preferably less than 0.3 RPM/s$^2$.

The thrust force $F_t$ on the rotor is correspondingly reduced to e.g. +/−10% of the thrust force during normal operation before the stop process or even less, such as +/−5% or less. The tower will as a reaction to the reduced thrust force move forward towards the direction of the wind under the influence of the elasticity of the tower, pass the upright, vertical position of the tower, where the top of the tower is at position B where z=0. The movement of the tower towards the direction of the wind will continue until the extreme position towards the wind is reached and the top is found at position C. Hereafter, the movement of the tower is in the direction of the wind and the tower will again pass the upright, vertical position of the tower, where the top of the tower is at position D where z=0. The movements will continue until it has been damped by aerodynamic damping or actively applied aerodynamic forces. The frequency of the pendulum motion is close to the natural first eigen-frequency of the tower, which however is influenced by the aerodynamic forces acting on the wind turbine.

The pitching of the rotor blades is stopped when the acceleration of the rotor is determined to be zero and a timer is started at the same time $t_2$, measuring out a predetermined time period ($t_3-t_2$), after which the top of the tower 2 is assumed to have passed the extreme upwind position C or at least be close to that position. The length of the predetermined time period ($t_3-t_2$) is preferably around half the period length of the first natural eigen-frequency mode of the wind turbine tower, i.e. for a typical tower the predetermined time period is about 3 seconds, so that it is ensured that the extreme upwind position C has been passed by the tip of the tower 2 before pitching is resumed. At the end of the predetermined time period, the pitching is again resumed until the blades are feathered, i.e. have reached the parking position at a pitch angle of about 90°. In the predetermined time period ($t_3-t_2$) the blades are not pitched except of the situation discussed below with reference to FIG. 4 due to the preferred on-off regulation of the emergency stop surveillance system of the present invention which allow for a simple but robust and reliable system.

Figure 3:
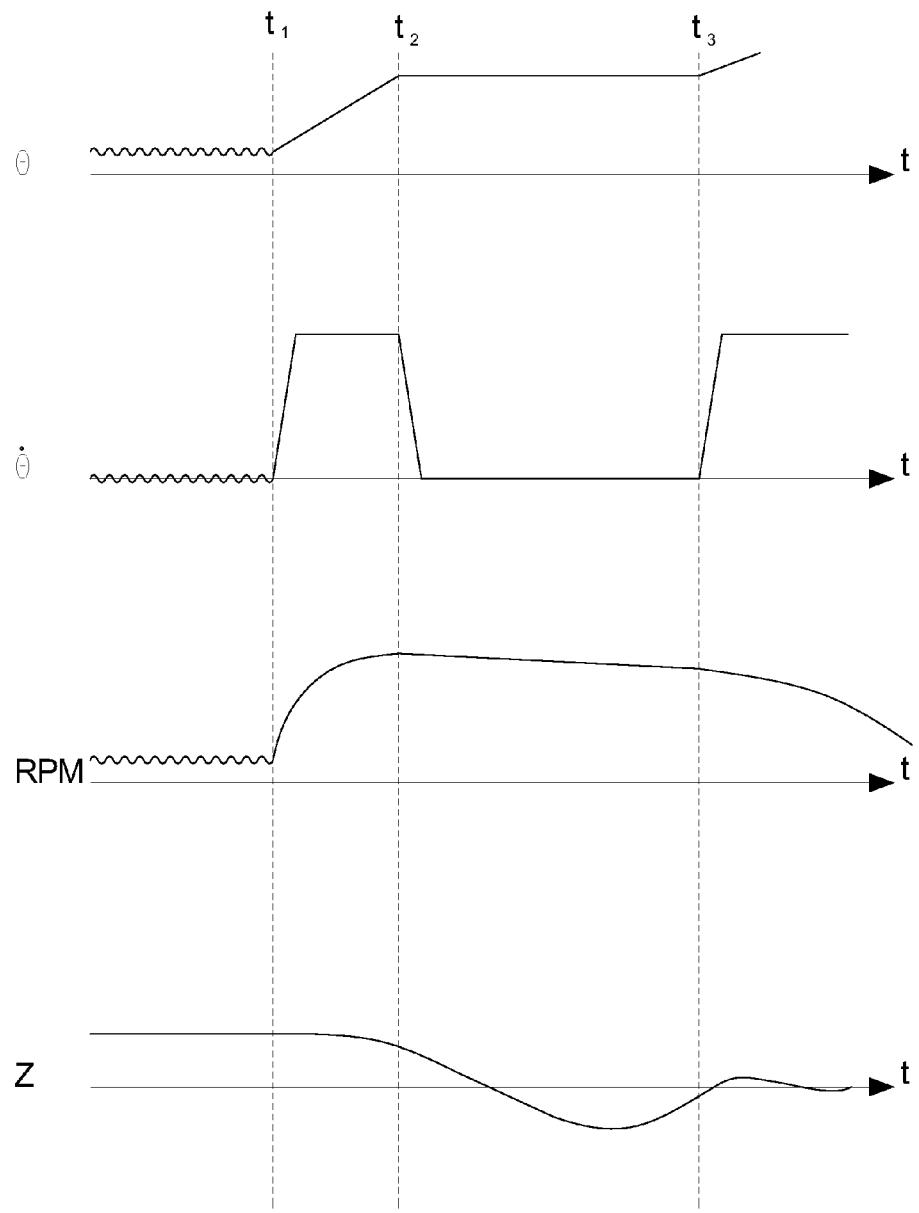
FIG. 3 shows the rate of change of pitch angle, the pitch angle, the angular speed of the wind turbine rotor and the deflection of a wind turbine during a shut-down according to a first embodiment of the invention.
Figure 4:
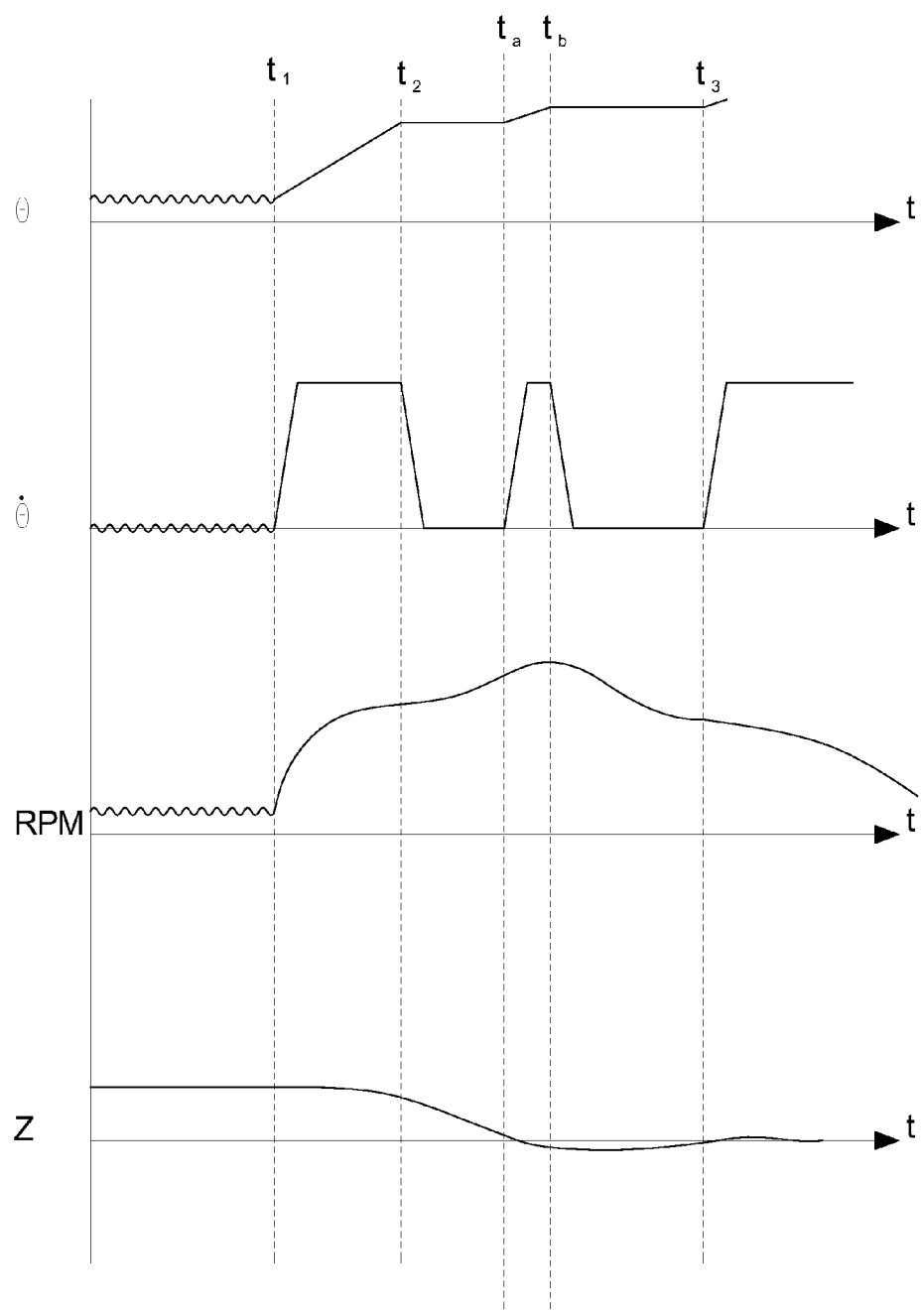
FIG. 4 shows the rate of change of pitch angle, the pitch angle, the angular speed of the wind turbine rotor and the deflection of a wind turbine during a shut-down according to a second embodiment of the invention.

In FIGS. 3 and 4, two embodiments of stop processes according to the present invention are shown where the pitch angle θ of the rotor blades is depicted in the upper curve as a function of time t, followed by the pitch velocity or rate of change of pitch angle $\dot{\theta}$. The angular speed RPM of the wind turbine rotor is shown in the third curve from above and the position z of the top of the tower as a function of time t is shown in the lowermost curve.

For both embodiments, the emergency stop pitch velocity $\dot{\theta}$ is controlled in an on-off manner to have either a predetermined value or zero, which is the case for a preferred simple and therefore robust emergency stop system, e.g. with a hydraulic system driving the pitching and being controlled by valves that are either full open or shut.

With the first embodiment shown in FIG. 3, the stop process starts at $t_1$ where the pitch velocity is accelerated to the emergency stop value. When the rotor acceleration is determined to be substantially zero at $t_2$ where the RPM reaches its highest value and the time derivative thereof is zero, the pitching is stopped and the pitch velocity is set to zero. The movement of the wind turbine tower continues and the extreme position towards the wind direction is reached. At the end $t_3$ of the predetermined time period, well after the extreme upwind position C has been passed by the tip of the tower, the timer causes the pitching to be resumed with the predetermined pitch velocity.

As a consequence of the pitching of the blades, the thrust force $F_t$ on the rotor is reduced from its initial value at normal operation of the wind turbine to a value about zero at the end of the first pitching action starting at $t_1$ where the tower tip is at position A. The state of substantially no thrust force state is continued until after the pitching action is resumed at $t_3$ after the predetermined time period ($t_3-t_2$) is measured out and the upwind extreme position C of the tower top has been passed. The resumed pitching action results in a rotor blade pitch angle creating a negative thrust force, i.e. against the direction of the wind and, in this part of the motion of the tower (from position C to position D), against the direction of movement of the tower top. The negative thrust force results in turn in a reduction of the amplitude of the oscillations or pendulum motion of the tower as shown in the lowermost curve showing the deviation z of the tower top from the vertical position. The thrust force is to a large extend proportional to the aerodynamic torque on the wind turbine rotor, and the negative thrust force will be accompanied by a negative acceleration of the rotor that will reduce its rotation.

The consequences of the stop process strategy of FIG. 3 are that the amplitude z of the tower top is controlled and an excessive bending moment $M_r$ at the tower root is prevented.

A second stop process strategy is disclosed in FIG. 4 where the angular speed of the rotor increases after the pitching was stopped at $t_2$ which may happen occasionally due to e.g. a sudden wind gust. In case the RPM has increased with a predetermined amount since $t_2$, such as 1 RPM/s, or alternatively with 20% or even only 10% of the RMP at $t_2$, the pitching is resumed at $t_a$ until the angular acceleration again is substantially zero at $t_b$, whereafter the pitching again is stopped. Alternatively, the pitching is resumed at $t_a$ in case a predetermined higher threshold value of the rotor angular acceleration is reached, such as 0.8 RPM/s². The timer measures out the predetermined time period regardless of this incidence and the pitching is still resumed at the same time $t_3$ as for the embodiment shown in FIG. 3.

Figure 5:
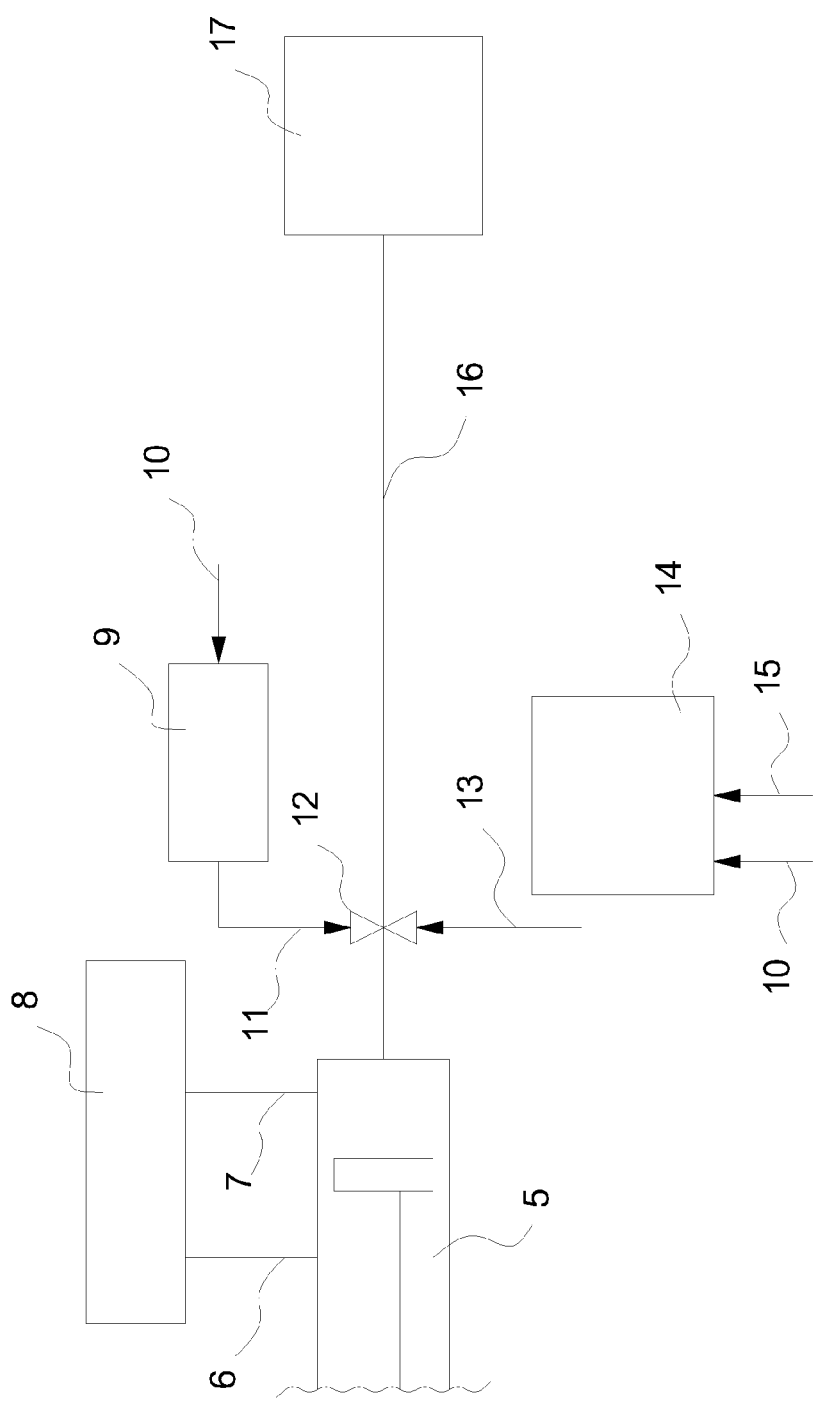
FIG. 5 is a schematic view of a first embodiment of the present invention.

A first emergency stop control system is schematically shown in FIG. 5, where an emergency hydraulic pressure accumulator 17 may deliver a hydraulic fluid under pressure to the pitch drive cylinders 5 (of which only one is shown) via a connection line 16 and an on/off control valve 12. Under ordinary operation of the wind turbine, the pitch control system 8 controls the pitch angle of each of the rotor blades by directing hydraulic fluid to the pitch drive cylinder 5 via the connection lines 6, 7. In case of e.g. a voltage drop on the electric distribution grid or a disconnection of the wind turbine from the grid, an emergency stop input 10 is received at the emergency stop controller 9 which in response opens the valve 12 between the hydraulic pressure accumulator 17 and the pitch drive cylinders 5 so that the blades of the wind turbine will pitch fast with an angular rate of 10-15°/s towards a parking position at a pitch angle of about 90°. The emergency stop input 10 is also received at the emergency stop surveillance system 14 together with a measure 15 of the angular speed of the rotor shaft, preferably measured by means of a fiber optical gyro. The emergency stop surveillance system 14 comprises a timer preset to a predetermined time and a differentiator computing the angular acceleration of the rotor from the angular speed of the rotor shaft. The emergency stop surveillance system 14 may then control the same on/off control valve 12 as the emergency stop controller 9 in the manner described above, so that the valve 12 is shut by the emergency stop surveillance system 14 and the timer is started at $t_2$ when the angular acceleration becomes zero after the emergency stop input 10 has been received, and that the valve 12 is opened again at the end $t_3$ of a predetermined time period as measured out by the timer of the emergency stop surveillance system 14. Should the angular speed of the rotor increase with more than 1 RPM/s during the predetermined time period, the emergency stop surveillance system 14 will open the valve 12 whereby pitching is resumed. In case the angular acceleration again reaches zero again within the predetermined period measured out by the timer regardless of this re-opening of the valve 12, the valve 12 will be closed again by the emergency stop surveillance system 14 until the end of the predetermined time period, where the valve 12 will be opened by the emergency stop surveillance system 14. With this construction, a simple and robust construction is obtained with the required reliability.

Figure 6:
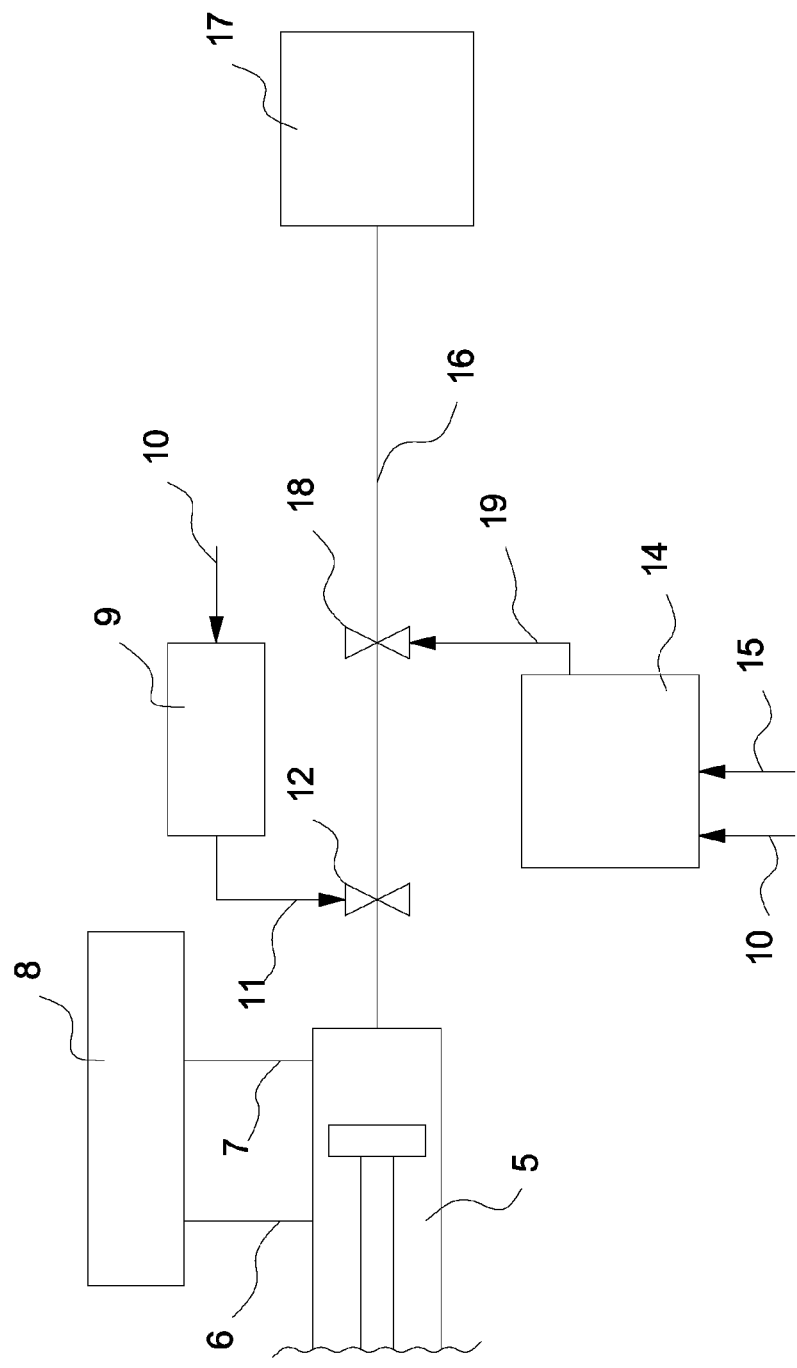
FIG. 6 is a schematic view of a second embodiment of the present invention.

Alternatively, a second control valve 18 may be provided in the emergency control stop system as shown in FIG. 6 so that the emergency stop surveillance system 14 controls the pitching of the blades in an on/off manner by controlling the second control valve 18 instead of the first control valve 12. Hereby it is possible that the emergency stop controller 9 may control the pitching during the emergency stop process with variable angular pitch velocity by means of the first valve 12 whereas the second valve 18 is an on/off valve controlled solely by the emergency stop surveillance system 14. Also, the emergency stop surveillance system 14 will in this situation be a stand-alone system operating generally independent of other components of the wind turbine.

The emergency stop surveillance system 14 could alternatively be formed as an integrated part of the emergency stop controller 9.

Alternative solutions to the ones shown in FIGS. 5 and 6 and still within the scope of the present invention include an electrical pitch system where the power for driving the blade pitch is provided by an Uninterruptible Power Supply (UPS) instead of the hydraulic pressure accumulator 17, the pitching of the blades is driven by electric motors instead of the hydraulic pitch drive cylinders 5 and electric switches replace the valves 12, 18. Such electrical pitch system could be implemented in a wind turbine using electric pitch for ordinary operation or it could be applied as an auxiliary pitching system for emergency stop of a wind turbine operating with a parallel electric or hydraulic pitching system for ordinary operation. The hydraulic emergency stop control system may inter alia be implemented in wind turbines using electric pitch or hydraulic pitch for ordinary operation.

What is claimed is:

1. A method for controlling a pitch angle of blades of a wind turbine rotor during an emergency stop process of the rotor from an operating state, the method comprising the steps of
   continuously determining a measure of an angular acceleration of the rotor,
   initiating pitching of the rotor blades and continuing pitching until a time ($t_2$) where the determined angular acceleration of the rotor is substantially zero, and
   resuming pitching of the rotor blades at the end of a predetermined time period ($t_3$-$t_2$) after the time ($t_2$) where the determined angular acceleration of the rotor was substantially zero.

2. The method according to claim 1, wherein the pitching of the rotor blades is controlled in an on-off manner during the emergency stop process.

3. The method according to claim 1, wherein said predetermined time period ($t_3$-$t_2$) is in the range of 0.25 to 0.8 times a period length of a first natural eigen-frequency mode of a wind turbine tower.

4. The method according to claim 1, wherein said predetermined time period ($t_3$-$t_2$) is in the range of 2 to 5 seconds.

5. The method according to claim 1, comprising the step of starting a time measurement at the time ($t_2$) when the determined angular acceleration of the rotor is substantially zero, and controlling said resuming of pitching of the rotor blades in response to said time measurement reaching the end of the predetermined time period ($t_3$-$t_2$).

6. The method according to claim 1, comprising the steps of
   closing a valve in a hydraulic connection between an emergency supply of hydraulic pressure and drive means for driving the pitching of the rotor blades at the time ($t_2$) when the determined angular acceleration of the rotor is substantially zero, and
   opening said valve said predetermined time period ($t_3$-$t_2$) after the time ($t_2$) where the determined angular acceleration of the rotor was substantially zero.

7. The method according to claim 1, comprising the steps of
   opening an electrical switch in an electric connection between an emergency power supply and drive means for driving the pitching of the rotor blades at the time ($t_2$) when the determined angular acceleration of the rotor is substantially zero, and
   closing said electrical switch said predetermined time period ($t_3$-$t_2$) after the time ($t_2$) where the determined angular acceleration of the rotor was substantially zero.

8. The method according to claim 1, further comprising the step of
   resuming pitching of the rotor blades within said predetermined time period ($t_3$-$t_2$) in case the determined angular velocity of the rotor reaches a value being a predetermined amount higher than an angular velocity at the time ($t_2$) where the determined angular acceleration of the rotor was substantially zero.

9. The method according to claim 8, wherein the pitching is stopped again in case the determined angular acceleration of the rotor is substantially zero within said predetermined time period ($t_3$-$t_2$).

10. The method according to claim 8, wherein said predetermined amount of angular velocity is within the range of 0.75 RMP/s to 1.5 RPM/s.

11. The method according to claim 1, wherein the step of determining a measure of the angular acceleration of the rotor comprises measuring an angular speed of the rotor shaft and determining a time derivative thereof.

12. The method according to claim 1, wherein the step of determining a measure of the angular acceleration of the rotor comprises measuring an angular strain of a rotor shaft.

13. A wind turbine comprising an emergency stop control system having means for controlling an emergency stop process of the wind turbine rotor according to the method of claim 1.

14. The wind turbine according to claim 13, wherein said emergency stop control system operates independently from a pitch control system for ordinary operation of the wind turbine.

15. The method according to claim 3, wherein said predetermined time period ($t_3$-$t_2$) is in the range of 0.4 to 0.6 times the period length of the first natural eigen-frequency mode of the wind turbine tower.

16. The method according to claim 4, wherein said predetermined time period ($t_3$-$t_2$) is in the range of 2.5 to 4 seconds.

* * * * *